(12) United States Patent
Tirona

(10) Patent No.: US 11,832,597 B2
(45) Date of Patent: Dec. 5, 2023

(54) AQUARIUM CORAL MOUNTING APPARATUS AND METHOD OF USE

(71) Applicant: CORAL EUPHORIA LLC, Chula Vista, CA (US)

(72) Inventor: Abram Pagtakhan Tirona, Chula Vista, CA (US)

(73) Assignee: CORAL EUPHORIA LLC, Chula Vista, CA (US)

( * ) Notice: Subject to any disclaimer, the term of this patent is extended or adjusted under 35 U.S.C. 154(b) by 206 days.

(21) Appl. No.: 17/381,012

(22) Filed: Jul. 20, 2021

(65) Prior Publication Data

US 2023/0022172 A1 Jan. 26, 2023

(51) Int. Cl.
*A01K 63/00* (2017.01)

(52) U.S. Cl.
CPC .................... *A01K 63/006* (2013.01)

(58) Field of Classification Search
CPC .. A01K 63/006; A01K 61/78; A47G 33/1206; A47G 33/124
See application file for complete search history.

(56) References Cited

U.S. PATENT DOCUMENTS

| | | | | |
|---|---|---|---|---|
| 3,744,454 A * | 7/1973 | Willinger | ............. | A01K 63/006 428/17 |
| 5,035,389 A * | 7/1991 | Wang | .................... | F16M 11/041 248/225.11 |
| 5,356,105 A * | 10/1994 | Andrews | ................. | B63B 35/14 248/221.11 |
| 5,365,884 A * | 11/1994 | Jones | .................... | A01K 63/006 D30/106 |
| 5,433,416 A * | 7/1995 | Johnson | ............... | B65D 23/003 403/381 |
| 5,435,511 A * | 7/1995 | Hsu | ........................ | F16M 13/00 403/374.2 |
| 5,855,982 A * | 1/1999 | Wechsler | ............. | A01K 63/006 47/69 |
| 6,481,679 B1 * | 11/2002 | Bennett | ................ | F16M 13/022 248/223.41 |
| 6,637,707 B1 * | 10/2003 | Gates | ........................ | A47F 5/08 248/222.12 |
| 7,007,903 B2 * | 3/2006 | Turner | ..................... | E04B 1/00 248/220.21 |
| 7,172,164 B2 * | 2/2007 | Fuelling | ................. | A01K 97/10 248/314 |
| 8,147,165 B2 | 4/2012 | Sung | | |

(Continued)

FOREIGN PATENT DOCUMENTS

BR 102018007496 A2 10/2019
CA 2470353 A1 * 12/2004 ........... A01K 63/006

(Continued)

*Primary Examiner* — Tien Q Dinh
*Assistant Examiner* — Katelyn T Truong
(74) *Attorney, Agent, or Firm* — Procopio, Cory, Hargreaves & Savitch LLP

(57) ABSTRACT

A coral mounting apparatus that facilitates mounting a live coral or other decoration to rock in an aquarium comprising a coral mount; a dock that is slidably receivable within the coral mount; and a docking mechanism that enables the dock to slide in and towards with respect to the coral mount upon docking, and away and slide out with respect to the coral mount upon undocking.

14 Claims, 4 Drawing Sheets

(56) References Cited

U.S. PATENT DOCUMENTS

| | | | | |
|---|---|---|---|---|
| 8,448,829 B2 * | 5/2013 | Watanabe | ............ | H05K 5/0073 |
| | | | | 224/547 |
| 9,545,085 B1 | 1/2017 | Yim | | |
| 10,890,207 B2 * | 1/2021 | Kennedy | ............... | F16B 47/006 |
| 2005/0022749 A1 | 2/2005 | Amblard | | |
| 2009/0114162 A1 * | 5/2009 | Locklear | .............. | A01K 63/006 |
| | | | | 119/245 |
| 2010/0019110 A1 * | 1/2010 | Shepley | ............... | A01K 63/006 |
| | | | | 248/206.5 |
| 2012/0096570 A1 * | 4/2012 | Tran | .................... | A01K 63/006 |
| | | | | 119/200 |
| 2013/0284106 A1 * | 10/2013 | Moewe | ................ | A01K 63/006 |
| | | | | 119/253 |
| 2015/0313190 A1 * | 11/2015 | Edwards | ................ | A01K 61/85 |
| | | | | 119/230 |
| 2017/0150702 A1 * | 6/2017 | Bresolin | .............. | A01K 63/006 |
| 2020/0315145 A1 * | 10/2020 | O'Hare | .................. | A01K 61/00 |

FOREIGN PATENT DOCUMENTS

| | | | |
|---|---|---|---|
| FR | 2937835 | A1 | 5/2010 |
| FR | 2995761 | A1 | 3/2014 |

\* cited by examiner

AQUARIUM CORAL MOUNTING APPARATUS AND METHOD OF USE

FIELD OF THE INVENTION

The present invention relates, in general, to an apparatus for mounting live corals or other decorations to rocks in an aquarium.

BACKGROUND OF THE INVENTION

In the past, to add live corals into an aquarium, live corals are attached to rocks on the floor of the aquarium with epoxy and/or super glue. This must be done underwater, in the aquarium, which can be very difficult. Affixing coral to rock underwater with glue or epoxy is not ideal because, compared to dry super glue or epoxy, 1) wet super glue or epoxy is not as strong, 2) the bond itself is weaker, and 3) the curing/setting/drying time is prolonged. This often results in the coral falling down as a result of gravity, water current, or an aquarium inhabitant knocking it over. This problem is exacerbated for larger and heavier corals, such as when the corals grow into mature coral colonies. Relocating coral within the aquarium becomes even more challenging.

SUMMARY OF THE INVENTION

An aspect of the invention involves a coral mounting apparatus that makes mounting corals to rock in an aquarium much easier than was done in the past.

Another aspect of the invention involves a coral mounting apparatus that facilitates mounting a live coral or other decoration to rock in an aquarium comprising a coral mount; a dock that is slidably receivable within the coral mount; and a docking mechanism that enables the dock to slide in and towards with respect to the coral mount upon docking, and away and slide out with respect to the coral mount upon undocking.

One or more implementations of the aspect of the invention described immediately above includes one or more of the following: the dock includes a base with a cavity and a centrally disposed hole, both of which are configured to receive an adhesive to bond the dock to the rock so that the dock and the adhesive function as one piece; the coral mount includes a mount frame having parallel angled rail receiving tracks shaped to enable the dock to slide in and towards with respect to the coral mount upon docking, and away and slide out with respect to the coral mount upon undocking; the coral mount includes a dock insertion area including a side rail traversing ledge; the dock includes a base with a centrally disposed hole, a dock face, parallel lateral side walls with laterally outwardly extending side rails and spaced related to the dock face, and a flange end; the docking mechanism includes the parallel angled rail receiving tracks, the side rail traversing ledge of the coral mount, and the laterally outwardly extending side rails of the dock; and/or the docking mechanism is configured to enable the quick and easy removal, adding, and moving of live corals or other decorations to one or more rocks in the aquarium.

Another aspect of the invention involves a method of using a coral mounting apparatus that facilitates mounting a live coral or other decoration to rock in an aquarium comprising a coral mount, the coral mounting apparatus includes a dock that is slidably receivable within the coral mount; and a docking mechanism that enables the dock to slide in and towards with respect to the coral mount upon docking, and away and slide out with respect to the coral mount upon undocking, the method comprising sliding the dock in and towards with respect to the coral mount upon docking, and sliding the dock out and away with respect to the coral mount upon un docking.

One or more implementations of the aspect of the invention described immediately above includes one or more of the following: the coral mount includes a dock insertion area including a side rail traversing ledge, a mount frame having parallel angled rail receiving tracks shaped to enable the dock to slide in and towards with respect to the coral mount upon docking, and away and slide out with respect to the coral mount upon undocking; the dock includes a base with a centrally disposed hole, a dock face, parallel lateral side walls with laterally outwardly extending side rails and spaced related to the dock face, and a flange end; and a docking mechanism includes the parallel angled rail receiving tracks, the side rail traversing ledge of the coral mount, and the laterally outwardly extending side rails of the dock; and sliding the dock in and towards with respect to the coral mount upon docking includes sliding the laterally outwardly extending side rails of the dock over the side rail traversing ledge of the coral mount and along the parallel angled rail receiving tracks of the coral mount until the laterally outwardly extending side rails clear the side rail traversing ledge, and, when the flange end is over the side rail traversing ledge, the dock being moved towards or pushed down respect to the coral mount; and sliding the dock out and away with respect to the coral mount upon undocking includes the dock being moved away form or pulled up with respect to the coral mount and sliding the laterally outwardly extending side rails over the parallel angled rail receiving tracks and the side rail traversing ledge; adhering the dock to the aquarium rock in advance, while setting up the aquarium tank, outside of the aquarium tank, before the rock is underwater; mounting the live coral or other decoration onto the coral mount, outside of the aquarium tank; the coral mount and the dock are docked together underwater; the dock includes a base with a cavity and a centrally disposed hole, both of which are configured to receive an adhesive to bond the dock to the rock so that the dock and the adhesive function as one piece, and the method including adding an adhesive within the cavity and the centrally disposed hole and mounting the dock to the rock with the adhesive whereby the dock and the adhesive function as one piece; undocking the coral mount and the dock relative to each other from a location on one or more rocks in the aquarium, moving the coral mount and the live coral or other decoration to another location on one or more rocks in the aquarium, and docking the coral mount and the live coral or other decoration to a dock at the another location; and/or the one or more rocks are non-specialized aquarium rocks that are not specialized for mounting corals.

BRIEF DESCRIPTION OF DRAWINGS

The accompanying drawings, which are incorporated in and form a part of this specification illustrate embodiments of the invention and together with the description, serve to explain the principles of the invention.

DESCRIPTION OF EMBODIMENT OF THE INVENTION

Figure 1:
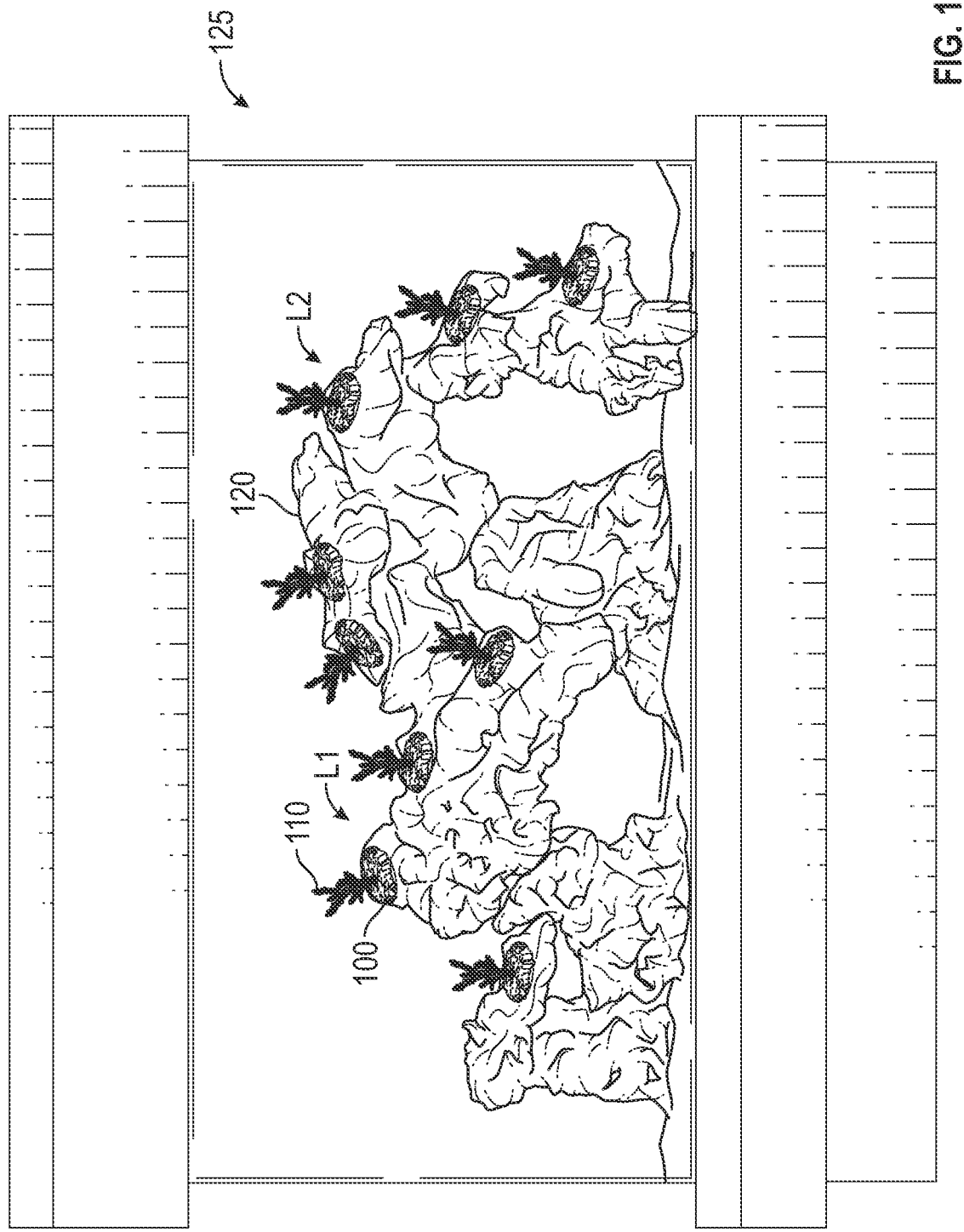
FIG. 1 is a perspective view of an embodiment of a plurality of coral mounting apparatuses adhered to a rock at the bottom of an aquarium, and illustrates live coral added with each of the coral mounting apparatuses and how live coral can be easily and quickly detached from one location on the rock and attached to another location on the rock with the coral mounting apparatuses.
Figure 2:
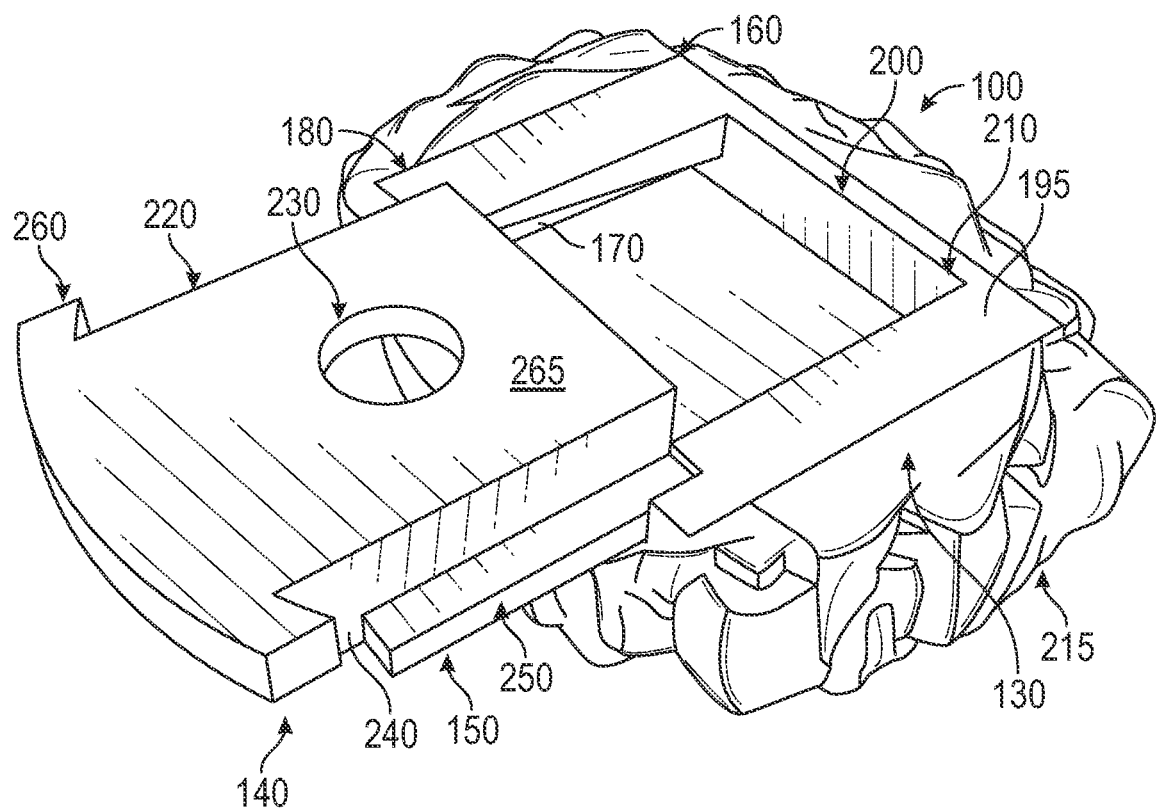
FIG. 2 is a bottom perspective view of the coral mounting apparatus, and shows an embodiment of a dock and a coral mount of the apparatus in an initial docking position.
Figure 3:
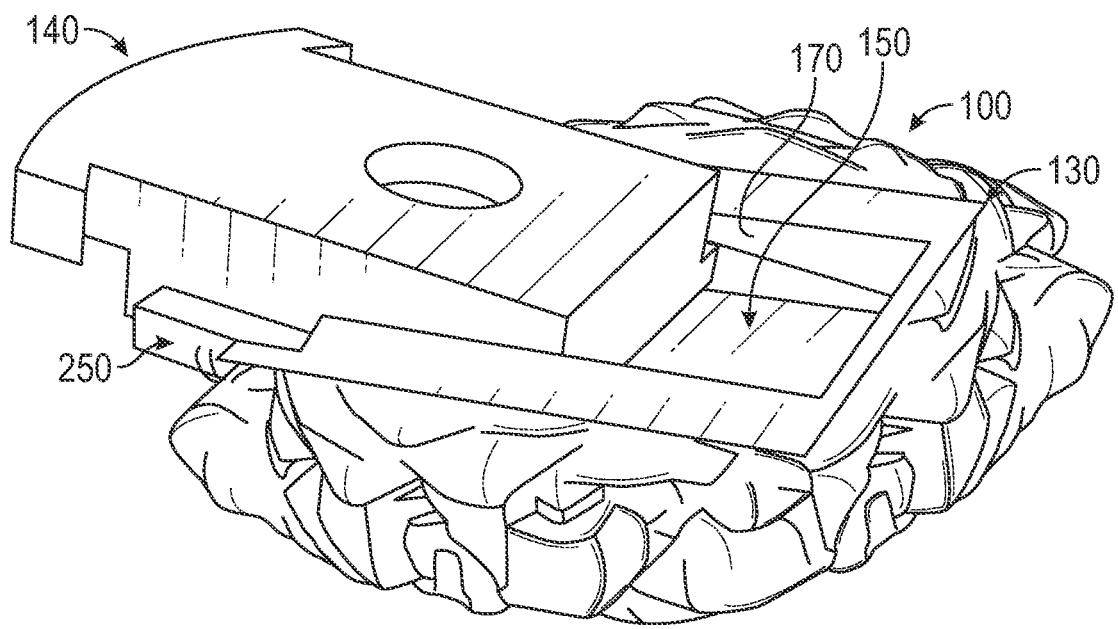
FIG. 3 is a bottom perspective view of the coral mounting apparatus, and shows the dock and the coral mount in a further docking position.
Figure 4:
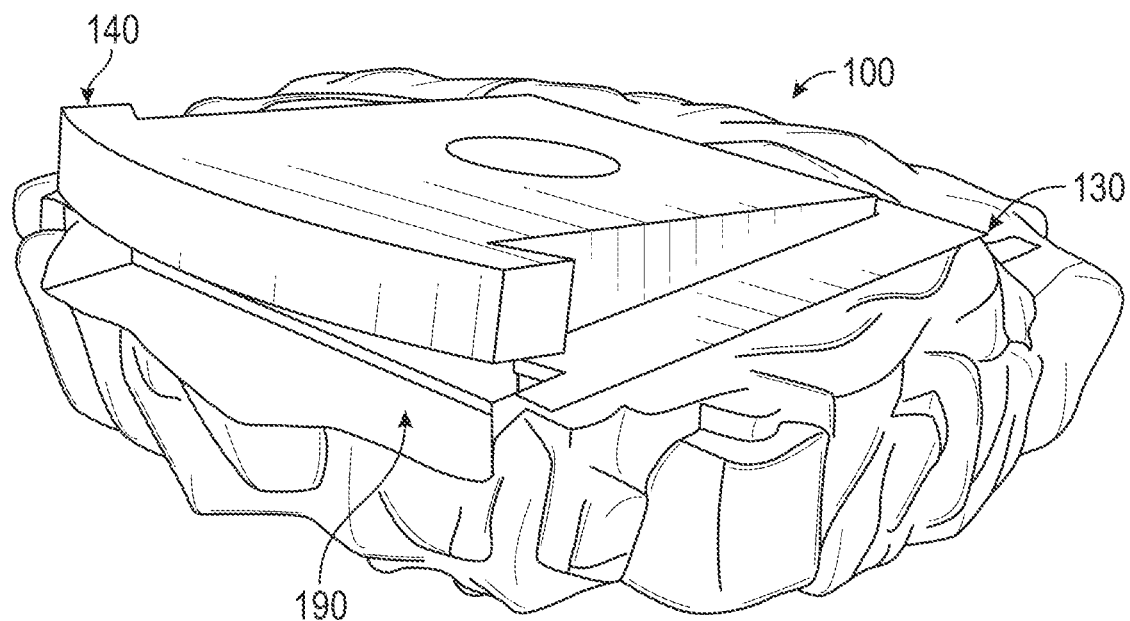
FIG. 4 is a bottom perspective view of the coral mounting apparatus, and shows the dock and the coral mount in a still further docking position where the dock is completely inserted or slid into the coral mount, but before the dock is pushed down into the coral mount.
Figure 5:
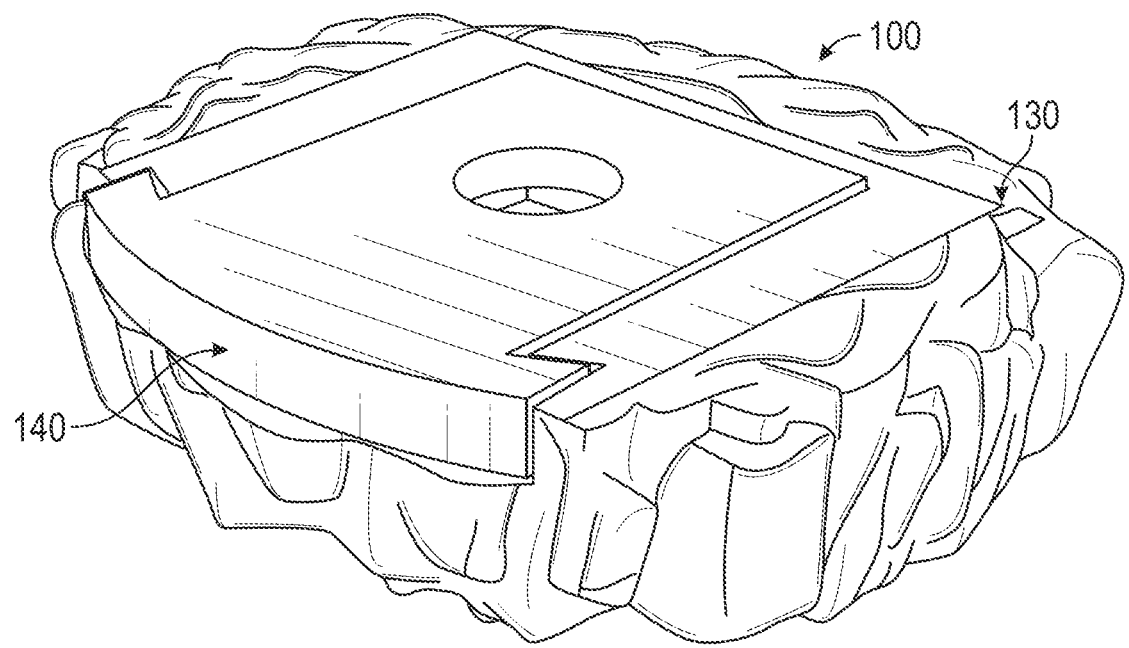
FIG. 5 is a bottom perspective view of the coral mounting apparatus, and shows the dock and the coral mount in a fully docked position where the dock is completely inserted or slid into the coral mount, and the dock is completely pushed down into the coral mount.

With reference to FIGS. 1-6, an embodiment of a coral mounting apparatus 100 that facilitates mounting, dismounting, and/or moving live corals or other decoration 110 to rock(s) 120 in an aquarium 125 will be described.

The coral mounting apparatus 100 includes a coral mount 130, a dock 140 that is slidably receivable within the coral mount 130, and a docking mechanism 150 that enables the dock 140 to slide in and push down with respect to the coral mount 130 upon docking or attachment and pull up and slide out upon undocking or detachment.

The coral mount 130, which is preferably plastic, includes a mount frame 160 including parallel angled rail receiving tracks or grooves 170 shaped to enable the dock 140 to slide in and push down with respect to the coral mount 130 upon docking or attachment and pull up and slide out upon undocking or detachment. The mount frame 160 includes a dock insertion area 180 including a side rail traversing ledge 190. The mount frame 160 includes a frame face 195, a dock receiving recess 200, a rectangular opening 210 surrounded on three sides by the frame face 195, and a coral mount façade (e.g., rock façade, coral façade) 215.

Figure 6:
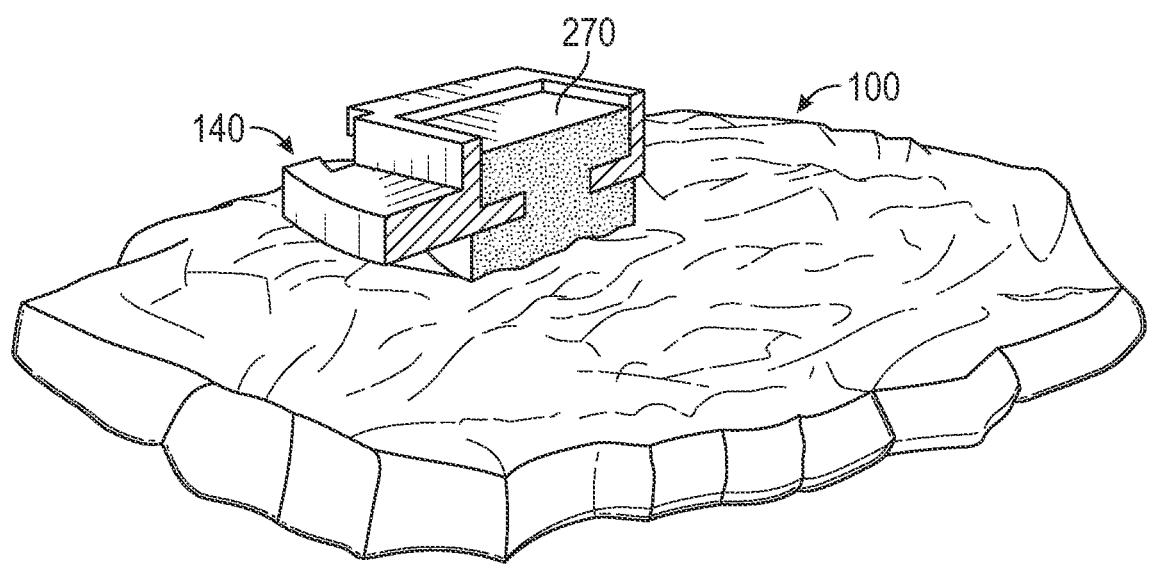
FIG. 6 is a partial perspective view of the dock with adhesive added for adhering the coral mount, and, hence, the coral mounting apparatus, to rock in the aquarium; the dock is shown cut in half to show the continuity of the adhesive through a hole in the dock.

The dock 140, which is preferably plastic, includes base 220 with a centrally disposed hole 230, parallel lateral side walls 240 with laterally outwardly extending side rails 250, and a flange end 260. The side rails 250 are spaced relative to a dock face 265. As shown in FIG. 6, the main purpose of the hole 230 is so that adhesive (e.g., epoxy and/or cyanoacrylate) 270 can sit between the rock 120 and the coral mounting apparatus 100 in the dock 140. This greatly strengthens the bond between the dock 140 and the rock 120; the epoxy 270 and the dock 140 essentially become one piece/integrated. If there was no hole 230, but just epoxy between the dock 140 and the rock 120, the bond would be much weaker between the dock 140 and the rock 120.

The docking mechanism 150 is formed by the parallel angled rail receiving tracks 170 and the side rail traversing ledge 190 of the coral mount 130, and the laterally outwardly extending side rails 250 of the dock 140.

The coral mounting apparatus 100 will now be described in use. The dock(s) 140 is/are secured with the epoxy/glue 270 to the aquarium rock 120 of the aquarium 125 beforehand, while setting up the aquarium 125, outside of the aquarium 125, before the rock 120 is underwater. The hole 230 enables the epoxy and glue 270 to sit between the rock 120 and the coral mounting apparatus 100 in the dock 140. This greatly strengthens the bond between the dock 140 and the rock 120; the epoxy 270 and the dock 140 essentially become one piece/integrated. The live coral (or aquarium decoration) 110 is mounted onto the coral mount(s) 130, outside of the aquarium 125. The coral mount(s) 130 and the dock(s) 140 are easily attached to each other underwater. For attachment or docking of the dock(s) 140 with respect to the coral mount(s) 130, each docking mechanism 150, which enables "slide in" and "push down" of the dock 140 with respect to the coral mount 130, is used to fasten the two components. During docking, as shown in FIGS. 2-6, as the dock 140 is inserted into the coral mount 130 (and/or as the coral mount 130 receives the dock 14), the laterally outwardly extending side rails 250 of the dock 140 slide over the side rail traversing ledge 190 of the coral mount 130 and into/along the parallel angled rail receiving tracks 170 of the coral mount 130 until the laterally outwardly extending side rails 250 clear the side rail traversing ledge 190. At this point, when the flange end 260 is over the side rail traversing ledge 190, the dock 140 is "pushed down" with respect to the coral mount 130, securing the live coral (or aquarium decoration) 110 on the rock 140. For undocking/detachment/removal, reverse motions of "pull up" and "slide out" of the dock 140 with respect to the coral mount 130 are performed. The dock 140 is "pulled up" and then slid out with respect to the coral mount 130. The laterally outwardly extending side rails 250 slide over the parallel angled rail receiving tracks 170 and the side rail traversing ledge 190 as the dock 140 is "pulled out" from the coral mount 130.

The coral mounting apparatus 100 makes it easy to remove, add, and/or move live corals 110 around the aquarium 125. In the past, when live coral grows out, it becomes heavier and more difficult to move to a different location and re-glue directly to a rock. Also in the past, specialized rocks were used to receive/mount live corals. As shown in FIG. 1, with the coral mounting apparatus 100, it easy to remove, add, and/or move live corals 110 around the aquarium 125 and the coral mounting apparatus 100 can be used with any rock(s), not only specialized rock(s). Live coral 110 is easily and quickly undocked/detached/removed by the undocking/detachment/removal process described above from one location L1 on the rock 120 and attached/docked by the attachment or docking process described above to another location L2 on the rock (or another rock) 120 with the coral mounting apparatuses 100.

The figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention, especially in the following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

I claim:

1. A coral mounting apparatus that facilitates mounting a live coral or other decoration to rock in an aquarium, comprising: a dock configured to be attached to the rock in the aquarium, the dock including a pair of spaced, non-contiguous parallel lateral side walls with laterally outwardly extending side rails; a coral mount slidable onto the dock, the coral mount including a mount frame having a frame face and pair ofspaced, non-contiguous parallel angled rail receiving tracks disposed at an acute angle relative to the frame face, and wherein the laterally outwardly extending side rails are slidably receivable within the pair of spaced, non-contiguous parallel angled rail receiving tracks at an acute angle relative to the frame face when docking and undocking the coral mount relative to the dock; and wherein the laterally outwardly extending side rails and the frame face are parallel when the coral mount is fully docked to the dock.

2. The coral mounting apparatus of claim 1, wherein the coral mount includes a dock insertion area including a side rail traversing ledge.

3. The coral mounting apparatus of claim 2, wherein the dock includes a centrally disposed hole configured to receive an adhesive to bond the dock to the rock so that the dock and the adhesive function as one piece.

4. The coral mounting apparatus of claim 1, wherein the coral mounting apparatus is configured to enable the quick and easy removal, adding, and moving of live corals or other decorations to one or more rocks in the aquarium.

5. A method of using the coral mounting apparatus of claim 1, comprising: sliding the coral mount at an acute angle relative to the frame face upon docking and undocking the coral mount relative to the dock, and fully docking the coral mount to the dock whereby the laterally outwardly extending side rails and the frame face are parallel.

6. The method of claim 5, wherein sliding including slidably receiving the laterally outwardly extending side rails within the pair of spaced, non-contiguous parallel angled rail receiving tracks at an acute angle relative to the frame face when docking and undocking the coral mount relative to the dock.

7. The method of claim 5, further including adhering the dock to the aquarium rock in advance, while setting up the aquarium tank, outside of the aquarium tank, before the rock is underwater.

8. The method of claim 7, further including mounting the live coral or other decoration onto the coral mount, outside of the aquarium tank.

9. The method of claim 5, wherein the coral mount and the dock are docked together underwater.

10. The method of claim 5, wherein the dock includes a centrally disposed hole configured to receive an adhesive to bond the dock to the rock so that the dock and the adhesive function as one piece, and the method including adding an adhesive within the centrally disposed hole and mounting the dock to the rock with the adhesive whereby the dock and the adhesive function as one piece.

11. The method of claim 5, further including undocking the coral mount and the dock relative to each other from a location on one or more rocks in the aquarium, moving the coral mount and the live coral or other decoration to another location on one or more rocks in the aquarium, and docking the coral mount and the live coral or other decoration to a dock at the another location.

12. The method of claim 11, wherein the one or more rocks are non- specialized aquarium rocks that are not specialized for mounting corals.

13. A coral mounting apparatus that facilitates mounting a live coral or other decoration to rock in an aquarium, comprising: a dock configured to be attached to the rock in the aquarium, a coral mount slidable onto the dock, a docking mechanism including laterally outwardly extending side rails, a frame face, rail receiving tracks disposed at an acute angle relative to the frame face, whereby the laterally outwardly extending side rails are slidably receivable within the rail receiving tracks at an acute angle relative to the frame face when docking and undocking the coral mount relative to the dock, and wherein the laterally outwardly extending side rails and the frame face are parallel when the coral mount is fully docked to the dock.

14. A method of using the coral mounting apparatus of claim 13, comprising: sliding the coral mount at an angle relative to the frame face upon docking and undocking the coral mount relative to the dock and fully docking the coral mount to the dock whereby the laterally outwardly extending side rails and the frame face are parallel.

* * * * *